(12) United States Patent
Davis et al.

(10) Patent No.: US 7,846,410 B2
(45) Date of Patent: Dec. 7, 2010

(54) REGENERATION OF POLYBORAZYLENE

(75) Inventors: Benjamin L. Davis, Los Alamos, NM (US); John C. Gordon, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 173 days.

(21) Appl. No.: 12/319,953

(22) Filed: Jan. 14, 2009

(65) Prior Publication Data

US 2009/0191110 A1    Jul. 30, 2009

Related U.S. Application Data

(60) Provisional application No. 61/011,404, filed on Jan. 16, 2008.

(51) Int. Cl.
*C01B 35/14* (2006.01)
*C01B 3/04* (2006.01)

(52) U.S. Cl. ............. 423/285; 252/188.25; 252/188.26; 423/284; 423/658.2

(58) Field of Classification Search ............. 423/648.1, 423/276, 285, 284; 252/188.25, 188.26
See application file for complete search history.

(56) References Cited

U.S. PATENT DOCUMENTS

| 6,025,454 | A | 2/2000 | Sneddon et al. | |
|---|---|---|---|---|
| 6,277,348 | B1 * | 8/2001 | Pujol et al. | 423/290 |
| 2007/0243122 | A1 * | 10/2007 | Ramachandran et al. | 423/285 |
| 2008/0311017 | A1 * | 12/2008 | Burrell et al. | 423/263 |

FOREIGN PATENT DOCUMENTS

WO   WO 2007/120511   10/2007

OTHER PUBLICATIONS

Stephens et al., "Ammonia-borane: the hydrogen source par excellence?" Dalton Transactions, 2007, pp. 2613-2626.
Matus et al., "Reliable Predictions of the Thermochemistry of Boron-Nitrogen Hydrogen Storage Compounds: BNH, x=2,3." J. Phys. Chem. A, 2007, 111, 4411-4421.
Bluhm et al. "Amineborane-Based Chemical Hydrogen Storage: Enhanced Ammonia Borane Dehydrogenation in Ionic Liquids." J. Am. Chem. Soc. 2006, 128, 7748-7749.
Denney et al., "Efficient Catalysis of Ammonia Borane Dehydrogenation." J. Am. Chem. Soc. 2006, 128, 12048-12049.
Stephens et al. "Acid Initiation of Ammonia-Borane Dehydrogenation for Hydrogen Storage." Angew. Chem. 2007, 119, 760-763.
Ramachandran et al., "Preparation of Ammonia Borane in High Yield and Purity, Methanolysis and Regeneration." Inorg. Chem., 2007, 46(19), 7810-7817.
Ott et al., Chemical Hydrogen Storage Research at Los Alamos National Laboratory, DOE Hydrogen Program FY 2007 Annual Progress Report, 2007, Oct. 2007, p. 499.

* cited by examiner

*Primary Examiner*—Stuart Hendrickson
*Assistant Examiner*—Syed Iqbal
(74) *Attorney, Agent, or Firm*—Juliet A. Jones

(57) ABSTRACT

Method of producing ammonia borane, comprising providing polyborazylene; digesting the polyborazylene with a dithiol-containing agent to produce a boro-sulfide compound and a byproduct; converting the byproduct to the boro-sulfide product of step (b) by reaction with a first alkyl-tin hydride; and, converting the boro-sulfide compound produced in steps (b) and (c) to ammonia borane by reaction with a second alkyl-tin hydride.

16 Claims, 1 Drawing Sheet

REGENERATION OF POLYBORAZYLENE

CROSS REFERENCE TO RELATED APPLICATION

This application claims priority to U.S. Provisional Patent Application 61/011,404, filed on Jan. 16, 2008, and incorporated herein in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD OF THE INVENTION

The present invention relates to regeneration of hydrogen storage materials used in fuel cells, specifically, to regeneration of ammonia borane from polyborazylene.

BACKGROUND OF THE INVENTION

A necessary target in realizing alternative energy sources, in particular in the transportation sector, is hydrogen storage for controlled delivery to an energy-producing fuel cell. Chemical hydrogen storage has been dominated by ammonia borane ($H_3B$—$NH_3$, or "AB"), which is a desirable material due to its high gravimetric capacity of hydrogen (19.6 wt %) and low molecular weight (30.7 g mol$^{-1}$). In contrast to the loss of $H_2$ from $C_2H_6$, which is substantially endothermic, AB has both hydridic and protic moieties, yielding a material from which $H_2$ can be readily released. As such, a number of publications have described $H_2$ release from amine boranes, yielding various rates depending on the method applied.

The viability of any chemical hydrogen storage system is critically dependent on efficient recyclability, but reports on the latter subject are sparse, invoke the use of high energy reducing agents, and suffer from low yields. There exists a need, therefore, for an energy efficient regeneration process for the spent fuel from $H_2$ depleted AB, which is energy efficient, has a high yield, and requires a minimum number of steps.

Spent hydrogen fuel composition depends on the dehydrogenation method from which it was produced. To date, the majority of efforts have employed metal-based catalysis. Metal-based catalysts have produced the fastest rates for a single equivalent of $H_2$ released from AB and up to 2.5 equivalents of $H_2$ can be produced within 2 hours. The predominant, and most desirable, product of hydrogen generation from ammonia borane via metal-based catalysis is polyborazylene ("PB").

SUMMARY OF THE INVENTION

The present invention meets the aforementioned need by using reagents, in particular thiols and amines, which avoid the formation of thermodynamically stable B—O bonds and the subsequent need for high energy reducing agents. Thiols form B—S bonds, which are weaker than analogous B—O bonds. Amines may extract the B—H moiety form polyborazylene. In addition, the acidity of the S—H moiety may facilitate a more efficient reaction.

The following describe some non-limiting embodiments of the present invention.

According to a first embodiment, a method of producing ammonia borane is provided, comprising providing polyborazylene; digesting the polyborazylene with an aromatic dithiol-containing agent to produce a boro-sulfide compound and a byproduct; converting the byproduct to the boro-sulfide product of step (b) by reaction with a first alkyl-tin hydride; and, converting the boro-sulfide compound produced in steps (b) and (c) to ammonia borane by reaction with a second alkyl-tin hydride.

According to a second embodiment, a method of producing ammonia borane is provided, comprising providing polyborazylene; digesting the polyborazylene with a dithiol compound to produce a boro-disulfide compound and a byproduct; converting the byproduct to the boro-disulfide product of step (b) by reaction with a trialkyl metal hydride; and, converting the boro-disulfide compound produced in steps (b) and (c) to ammonia borane by reaction with a dialkyl-metal hydride; wherein at least 60% of the polyborazylene is converted to ammonia borane.

DETAILED DESCRIPTION OF THE INVENTION

Figure 1:
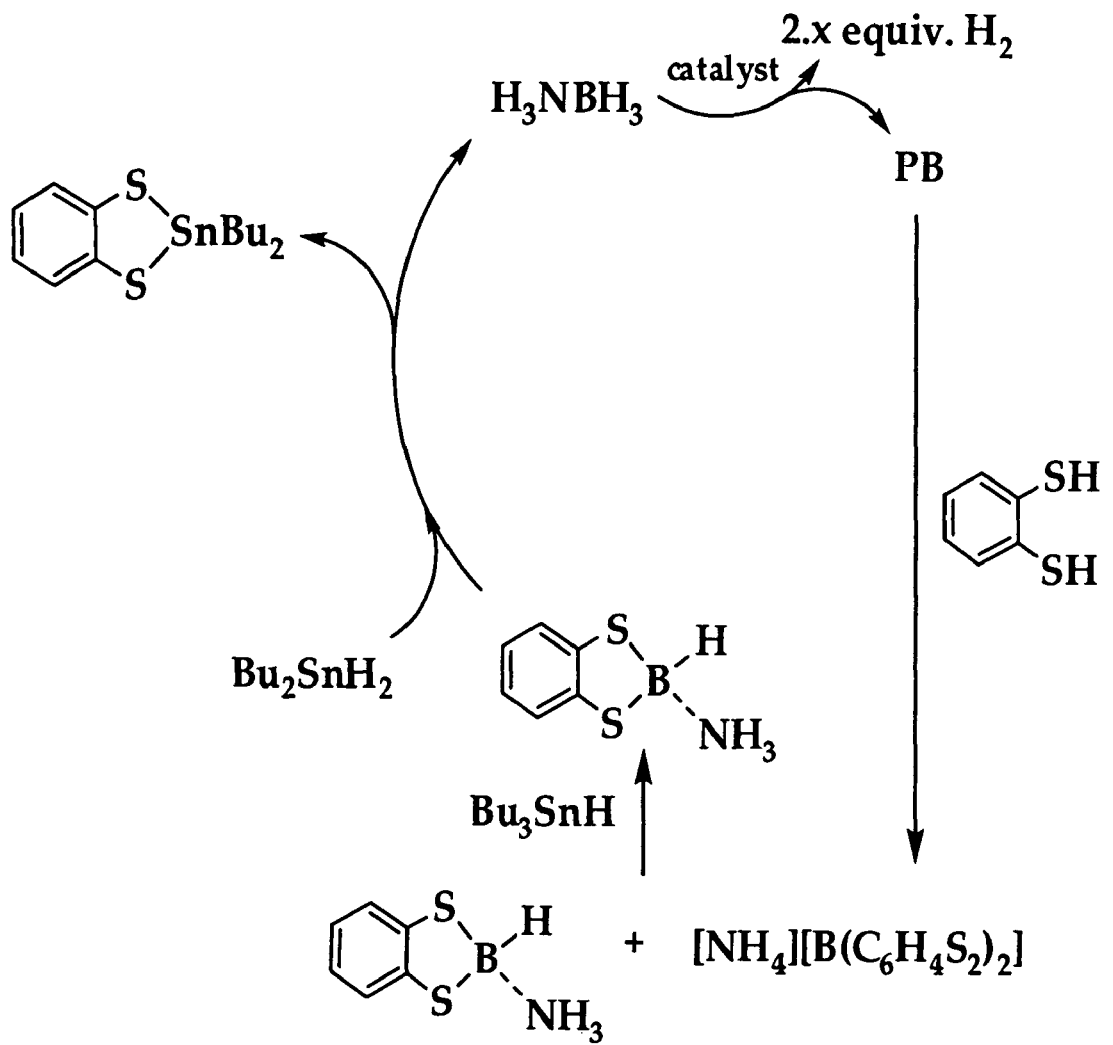
FIG. 1 is a schematic representation of the method of the present invention.

The present invention describes methods of producing ammonia borane, and more specifically, of regenerating ammonia borane from polyborazylene.

The polyborazylene (PB) of the present invention has the following structure:

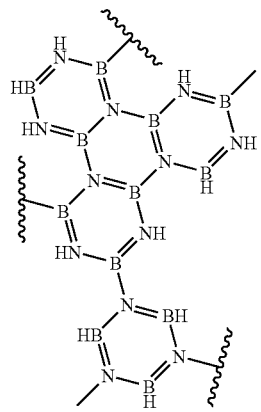

The PB may be produced, for example, by dehydrogenation of ammonia borane (AB). Dehydrogenation of AB may occur by a variety of means, one example of which is via catalysis by a base metal catalyst.

The present invention comprises the following steps, wherein the resulting products correspond to the structures as represented in FIG. 1.

Step 1:

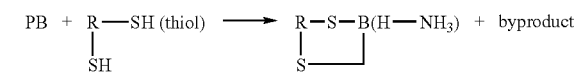

or alternatively;

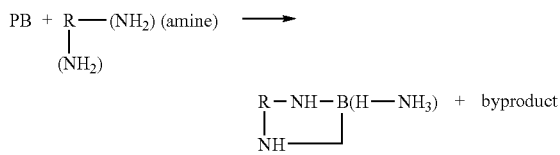

or alternatively;

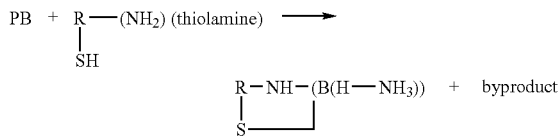

Step 2: byproduct+first alkyl metal hydride reductant→R—$S_2$—BH—$NH_3$

Step 3: R—$S_2$—BH—$NH_3$+second alkyl metal hydride reductant→AB

R may be H, a $C_1$-$C_6$ alkyl moiety (alkane, alkene or alkyne), a $C_3$-$C_8$ Cyclic hydrocarbon, a $C_3$-$C_8$ aryl moiety (i.e., a $C_3$-$C_8$ aromatic thiol), or combinations thereof. Herein, aryl is understood to include any functional group or substituent derived from a simple aromatic ring. In one embodiment, the thiol is a dithiol, and R is an aryl group (i.e., an aromatic dithiol). In one embodiment, the thiol is selected from the group consisting of thiophenol, benzenedithiol, toluene-3,4-dithiol, and combinations thereof. In one embodiment, the thiol is benzenedithiol. Similarly, the amine may comprise $C_3$-$C_8$ cyclic hydrocarbons or a $C_3$-$C_8$ aryl moiety. One example of a suitable amine is 1,2-diaminobenzene. Alternatively, a thiolamine may be used in the first step of the process, one non-limiting example being 1-amino-2-thiobenzene (o-thioaniline).

The byproduct may comprise [$NH_4$][B($C_6H_4S_2$)$_2$], although the exact structure of the byproduct may vary. In the second step, the byproduct is reduced to form additional R—$S_2$—BH—$NH_3$, thus significantly increasing the efficiency of the process. One example of a suitable reductant is an alkyl metal hydride. The alkyl moiety may be a $C_1$-$C_6$ alkyl moiety, and preferably may be butyl. One example of a suitable metal is Sn. Alternatively, the reductant may be a silane, one suitable example of which being ($CH_3CH_2$)$_3$—Si—H.

The first and second alkyl metal hydride reductants must be a source of hydrogen, and must be appropriately reactive, meaning that the boron is not over-reduced to borohydride and that a sufficient overall yield is obtained. One non-limiting example of a suitable first alkyl metal hydride reductant is tributyl tin hydride, or $Bu_3SnH$. One non-limiting example of a suitable second alkyl metal hydride is dibutyl tin dihydride, or $Bu_2SnH_2$. Both reductants are used in a slight molar excess relative to the reactant.

The yield of the process is understood herein to refer to the percentage of polyborazylene that is ultimately converted to ammonia borane. In one embodiment, the yield is at least 60%, alternatively is at least 65%, and alternatively is at least 70%. In one embodiment, the yield is from about 60% to about 99%, and alternatively is from about 65% to about 95%.

EXAMPLES

Example 1

Reaction of Polyborazylene with Dithiol

When benzenedithiol and PB were refluxed in THF, $^{11}$B NMR spectroscopy after 12 hours revealed that most of the PB had reacted to yield two new resonances. The upfield resonance (δ−5.6, d, $^1J_{B-H}$=128 Hz) was identified as ($C_6H_4S_2$)B—H.($NH_3$), by independent synthesis as well as comparison to a theoretical (DFT) calculated value (see Supplemental Information). The downfield resonance (δ 10.5 ppm, s) exhibits a similar chemical shift value to that of Li[B($C_6H_4S_2$)$_2$], suggesting that [$NH_4$][B($C_6H_4S_2$)$_2$] is formed. Attempts to make this product independently, via the reaction of ($C_6H_4S_2$)B—H.($NH_3$) and benzenedithiol, failed to yield a pure material even under driving conditions (heat and gas removal by freeze/pump/thaw cycles). When Li[B($C_6H_4S_2$)$_2$] was prepared independently according to the literature procedure and examined by $^{11}$B NMR, the same resonance (10.5 ppm) was observed, in contrast to that reported (δ 12.1 ppm) in the literature. Both resonances are also observed in the reaction of borazine and benzenedithiol, along with concomitant $H_2$ formation. This suggests that the benzenedithiol reacts with the product ($C_6H_4S_2$)B—H.($NH_3$) faster than borazine, releasing hydrogen as depicted in Scheme 1.

Example 2

Generation of Ammonia Borane

All reactions were performed under an inert atmosphere, using standard Schlenk line and glovebox techniques. Ethereal solvents and toluene were distilled from Na/benzophenone ketyl radical. $^1$H, $^{11}$B (128 MHz), and $^{119}$Sn (149 MHz) NMR spectra were recorded at room temperature (unless otherwise noted) on a Bruker AVANCE™ 400 MHz spectrometer. $^1$H spectra were referenced to the residual protons in the solvent and $^{119}$Sn NMR was referenced to $Me_4Sn$. $^{11}$B NMR was referenced to $BF_3$.etherate placed in a stem coaxial insert (Wilmad). All deuterated solvents were purchased from Cambridge Isotopes™ (Andover, Mass.). 1,2-benzeneditiol (96%, Acros™) was sublimed prior to use and stored cold. 1 M $BH_3$.THF in THF (Acros) was titrated with a solution of 1,2-benzenedithiol to calculate an accurate concentration. $NH_3$ in 1,4-dioxanes was used as received from Aldrich Chemical Company™. Polyborazylene (PB) was formed by the slow decomposition of borazine, received from Gelest™. All other reagents were obtained from AcroS™ and used as received. 1,3,2-benzodithiaborole was synthesized in situ as described in S. W. Hadebe, R. S. Robinson, Eur. J. Org. Chem. 2006, vol. 21, p. 4898, with the only modification being the use of $BH_3$.THF and benzenedithiol.[13] "$Bu_2SnH_2$ was prepared according to the method described in A. G. Hernan, P. N. Horton, M. B. Hursthouse, J. D. Kilburn, *J. Organomet. Chem.* 2006, vol. 691, p. 1466, distilled, and stored in the absence of light at −20° C.

1: 1,3,2-benzodithiaborole (0.07 mmol) was combined with 0.5 M $NH_3$ in 1,4-dioxanes (300 uL, 0.15 mmol) and the solvent was removed in vacuo yielding ($C_6H_4S_2$)B—H.$NH_3$ as a white solid (0.009 g, 76%). $^1$H NMR (THF): δ 7.15 (m, 2H), 6.79 (m, 2H), 5.2 (b s, 3.6H). $^{11}$B NMR (THF): δ −5.6 (128 Hz).

2: $^nBu_3SnH$ (0.041 g, 0.141 mmol) was combined with benzenedithiol (0.020 g, 0.141 mmol). After 12 h the $^1H$ NMR indicated consumption of the Sn—H resonance and the $^{119}Sn$ NMR revealed a single new peak, consistent with ($C_6H_4SH$ ($SSnBu_3$)), 2, formation. $^{119}Sn$ NMR (THF): δ 84.8.

3: $^nBu_2SnH_2$ (0.168 g, 0.717 mmol) was combined with benzenedithiol (0.102 g, 0.717 mmol) and stirred overnight. The volatiles were removed in vacuo, yielding $^nBu_2Sn(C_6H_4S_2)$, 3, as a white solid (0.262 g, 98%). $^1H$ NMR($C_6D_6$): δ 7.5 (m, 2H), 6.7 (m, 2H), 1.5 (m, 3.5H), 1.3 (m, 3.6H), 1.2 (m, 4.4H), 0.8 (t, 6H). $^{119}Sn$ NMR (THF): δ 116.

$[NH_4][B(C_6H_4S_2)_2]$ from 1 and 1,2-benzenedithiol. 1 (0.018 g, 0.106 mmol), 1,2-benzenedithiol (0.015 g, 0.106 mmol), and THF were heated at about 60° C. for several days. $^{11}B$ NMR indicated a new boron containing species had formed with a new singlet at 10.5 ppm, much larger than observed by heating 1 alone. A similar shift was observed in the literature for $LiB(C_6H_4S_2)_2$ at 12.1 ppm (J. Knizek, H. Noth, J. Organomet. Chem. v. 614-615 (2000), pp. 168-187). When the reaction of $LiBH_4$ and benzenedithiol was repeated, a singlet at 10.5 (referenced to $BF_3$-etherate) was obtained.

Regeneration of AB from Polyborazylene. PB (0.049 g, 0.61 mmol) was dissolved in THF and combined with 1,2-benzenedithiol (0.260 g, 1.83 mmol). This was heated overnight at 60° C. $^{11}B$ NMR indicated consumption of PB and formation of two new peaks corresponding to 1 and $[NH_4][B(C_6H_4S_2)_2]$. Excess $Bu_3Sn$—H (240 μL, 0.9 mmol) was added to reduce $[NH_4][B(C_6H_4S_2)_2]$ to 1 and convert unreacted benzenedithiol to 3. This solution was heated to 60° C. before the addition of $^nBu_2SnH_2$ (1020 μL, 4.86 mmol) in four portions over 40 minutes, reducing 1 to AB (0.038 g, 67%), which was isolated by extraction with toluene.

Reaction of Borazine and 1,2-benzenedithiol. Borazine (0.015 g, 0.186 mmol) and 1,2-benzenedithiol (0.080 g, 0.559 mmol) were combined in THF and heated to 65° C. overnight. The resulting $^{11}B$ NMR revealed two resonances, 10.5 ppm (s) and 5.6 ppm (d, 128 Hz). When the headspace gas was sampled by GC, more $H_2$ gas was detected relative to the control sample (only borazine and solvent).

In all embodiments of the present invention, all percentages are by weight of the total composition, unless specifically stated otherwise. All ratios are weight ratios, unless specifically stated otherwise. All ranges are inclusive and combinable. All numerical amounts are understood to be modified by the word "about" unless otherwise specifically indicated. All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

Whereas particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of producing ammonia borane, comprising:
   a) providing polyborazylene;
   b) digesting the polyborazylene with a dithiol-containing agent to produce a boro-sulfide compound and a byproduct;
   c) converting the byproduct to the boro-sulfide product of step (b) by reaction with a first alkyl-tin hydride; and,
   d) converting the boro-sulfide compound produced in steps (b) and (c) to ammonia borane by reaction with a second alkyl-tin hydride.

2. The method of claim 1, wherein the dithiol-containing agent comprises an aryl moeity.

3. The method of claim 2, wherein the dithiol-containing agent is selected from the group consisting of benzenedithiol, toluene-3,4-dithiol and combinations thereof.

4. The method of claim 3, wherein the thiol-containing agent is benzenedithiol.

5. The method of claim 1, wherein the ammonia borane is produced by reaction of ammonia borane with a tin-based reducing agent.

6. The method of claim 1, wherein the byproduct comprises $[NH_4][B(C_6H_4S_2)_2]$.

7. The method of claim 1, wherein the first alkyl-tin hydride is tributyl-tin hydride.

8. The method of claim 1, wherein the second alkyl-tin hydride is dibutyl-tin dihydride.

9. The method of claim 1, wherein at least 60% of the polyborazylene is converted to ammonia borane.

10. A method of producing ammonia borane, comprising:
    a) providing polyborazylene;
    b) digesting the polyborazylene with an aromatic dithiol compound to produce a boro-disulfide compound and a byproduct;
    c) converting the byproduct to the boro-disulfide product of step (b) by reaction with a trialkyl metal hydride; and,
    d) converting the boro-disulfide compound produced in steps (b) and (c) to ammonia borane by reaction with a dialkyl-metal dihydride;
    wherein at least 60% of the polyborazylene is converted to ammonia borane.

11. The method of claim 10, wherein the aromatic dithiol compound is benzenedithiol.

12. The method of claim 10 wherein the aromatic dithiol compound is toluene-3,4-dithiol.

13. The method of claim 10, wherein the ammonia borane is produced by reaction of ammonia borane with a tin-based reducing agent.

14. The method of claim 10, wherein the byproduct comprises $[NH_4][B(C_6H_4S_2)_2]$.

15. The method of claim 10, wherein the trialkyl metal hydride is tributyl-tin hydride.

16. The method of claim 10, wherein the dialkyl metal hydride is dibutyl-tin dihydride.

* * * * *